April 17, 1956     I. EDELMAN     2,742,559
REMOVABLE TRAY SUPPORT FOR ROTISSERIE
Filed Feb. 12, 1953     2 Sheets-Sheet 1
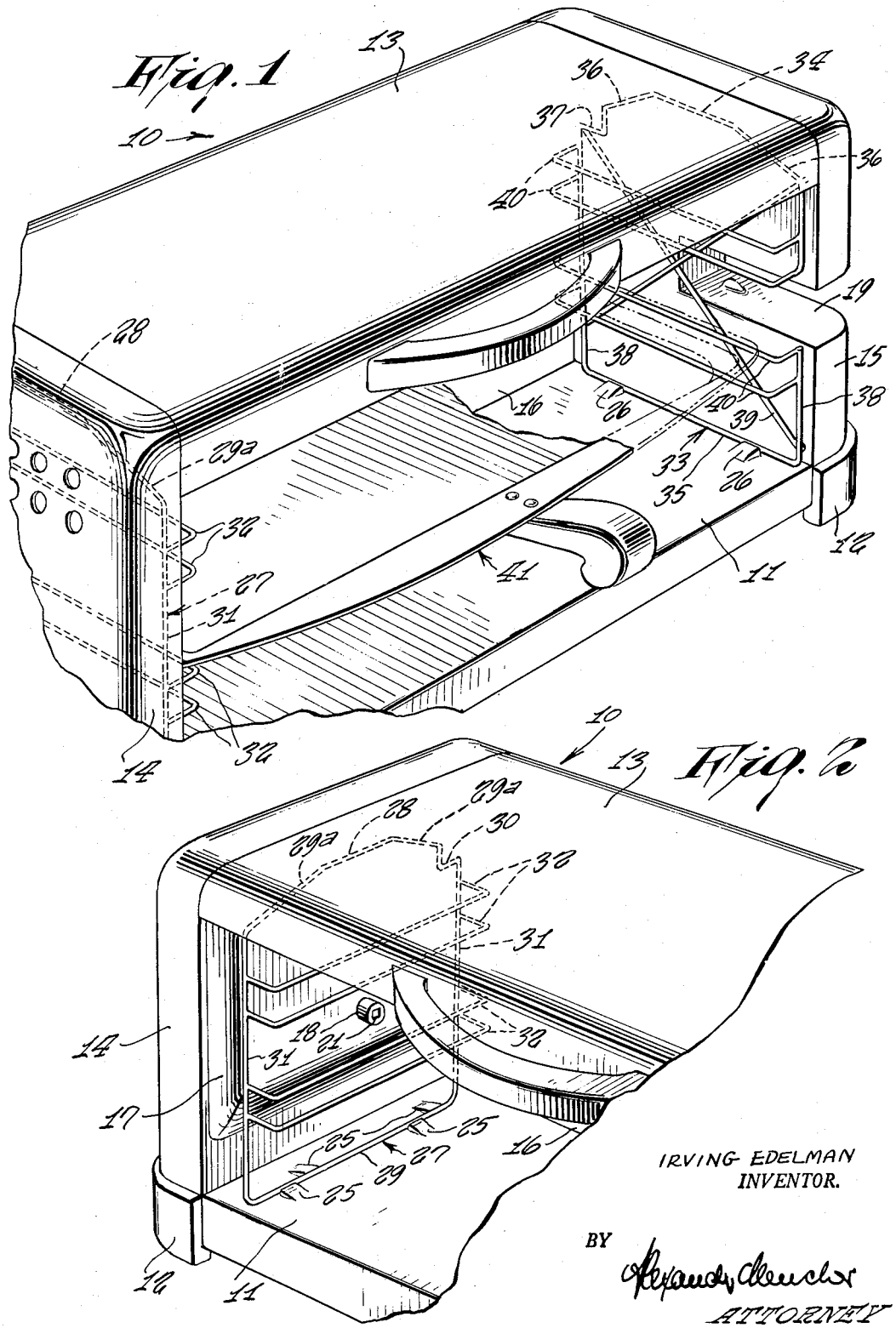
IRVING EDELMAN
INVENTOR.
BY
*ATTORNEY*

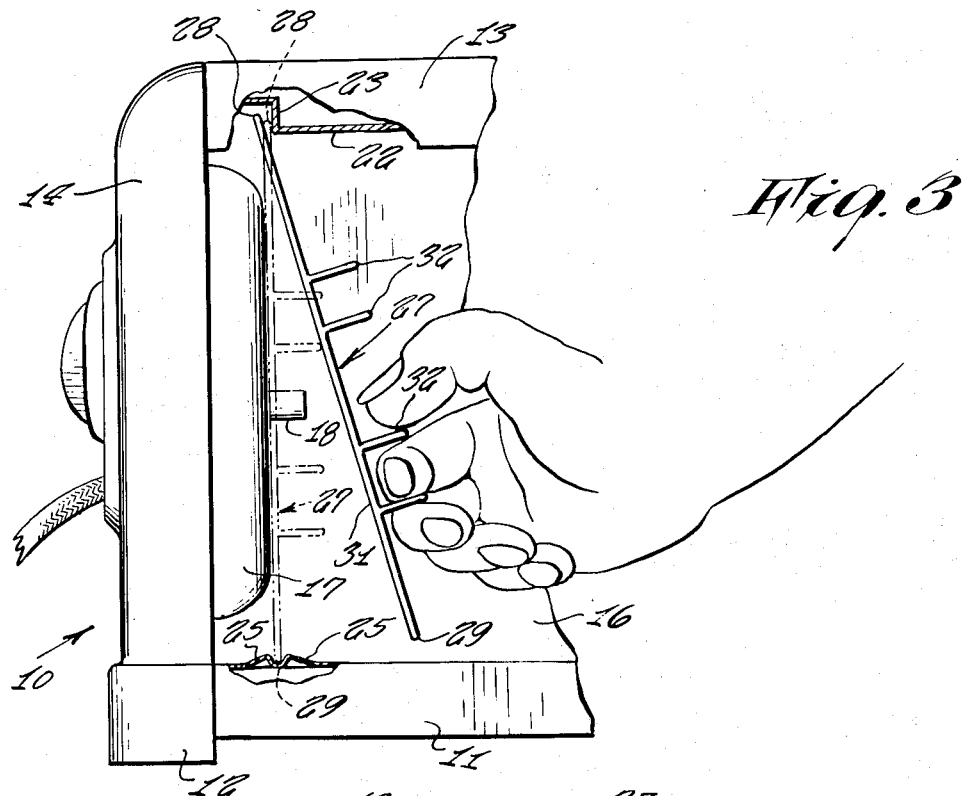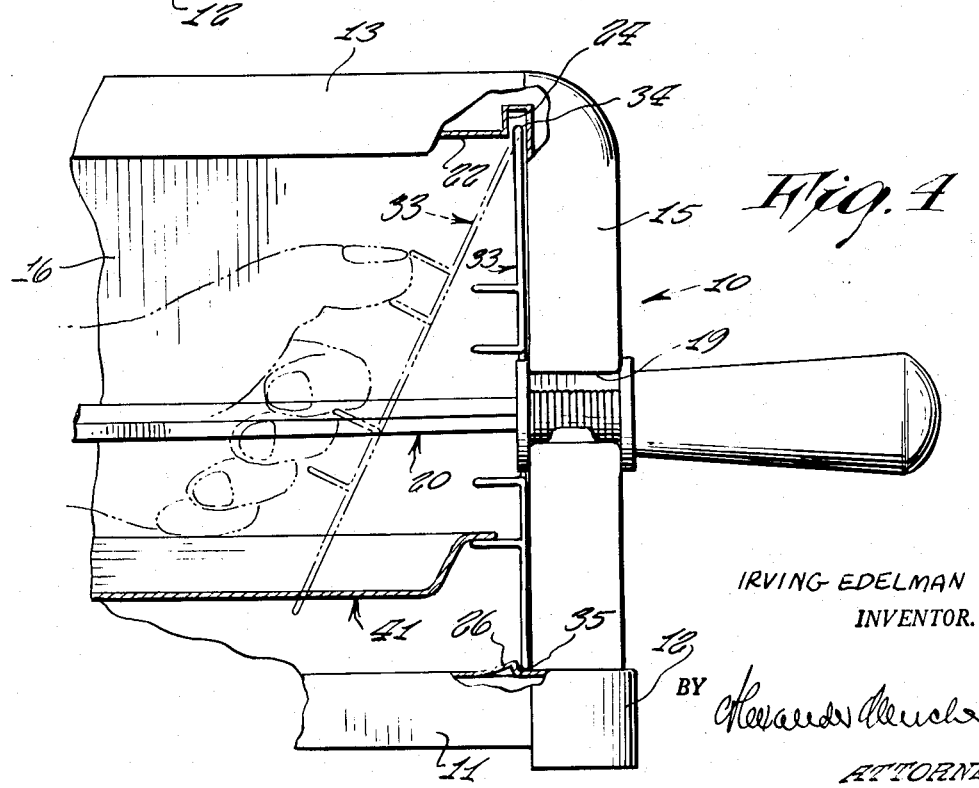

United States Patent Office 2,742,559
Patented Apr. 17, 1956

2,742,559

REMOVABLE TRAY SUPPORT FOR ROTISSERIE

Irving Edelman, Brooklyn, N. Y.

Application February 12, 1953, Serial No. 336,471

1 Claim. (Cl. 219—35)

This invention relates to rotisserie broiler combinations and more particularly to removable tray supports therefor.

It is an object of the present invention to provide removable tray supports for rotisserie broiler combinations which may be completely removed prior to insertion of the spit, thus increasing the interior capacity of the rotisserie by an amount equal to the volume normally occupied by the supports.

It is another object of the present invention to provide tray supports of the above type which are mounted upon a removable frame releasably positioned at each end of the broiler rotisserie combination, these frames being readily and easily snapped in and out of position without the necessity of unscrewing or unfastening other elements.

Other objects of the present invention are to provide removable tray supports for rotisserie broiler combinations bearing the above objects in mind which are of simple construction, inexpensive to manufacture, have a minimum number of parts, are easy to use and efficient in operation.

For other objects and for a better understanding of the present invention reference may be had to the following detailed description taken in connection with the accompanying drawing, in which:

Fig. 1 is a perspective view of a rotisserie broiler combination looking toward one end and showing the removable tray supports in operative position;

Fig. 2 is a view similar to Fig. 1 but looking toward the other end of the rotisserie broiler combination;

Fig. 3 is a fragmentary front elevational view showing the manner of snapping the removable tray supports into place at one end of the rotisserie broiler combination and Fig. 4 is a view similar to Fig. 3 but showing the removable tray supports in operative position at the other end of the rotisserie broiler combination.

Referring now more in detail to the drawing, in which similar reference numerals identify corresponding parts throughout the several views, there is shown a rotisserie broiler combination, referred to collectively as 10, and including the base 11 supported at each end on legs 12, substantially as illustrated.

Nichrome heating elements, not shown, are contained in the top 13 in the usual manner, the top 13 being supported at each end by side shells 14 and 15, and along one longitudinal edge by rear wall 16.

A rotisserie motor, not shown, is mounted within shell 14, in the usual manner of such constructions, and partly within a housing 17, the latter extending into the interior of the rotisserie, substantially as illustrated. The drive shaft 18 extends through the housing 17 and is provided with a rectangular opening 21 which cooperates with a spit slot 19 provided in the side shell 15 to rotatably mount the spit 20 (see Fig. 4).

In the practice of the present invention, the inner wall 22 of top portion 13 above the housing 17 is formed with a transverse shoulder 23, as shown in Fig. 3, while the other end of this inner wall 22 is formed with a transverse groove 24, as shown in Fig. 4, adjacent side shell 15. It will be noted that the shoulder 23 is parallel to and slightly spaced longitudinally from the face of housing 17, while the outer, vertical side of groove 24 is co-planar with the inner face of shell 15.

The base 11 at one end is integrally formed or stamped with complementary, transversely aligned upwardly extending lugs 25, substantially as illustrated in Figs. 2 and 3. Adjacent or complementary lugs 25 are spaced slightly apart longitudinally, providing a transverse groove therebetween. It will be noted that this transverse groove is aligned vertically with the slight spacing between the inner face of housing 17 and shoulder 23, as shown in Fig. 3.

The base 11 at its other end adjacent the inner face of side shell 15 is similarly formed or stamped with transversely aligned lugs 26, these lugs being spaced slightly from the inner face of side shell 15 and providing thereby a second transverse groove. It will be noted that this second transverse groove is aligned vertically with transverse groove 24 provided at one end of inner wall 22 of top portion 13, as shown in Fig. 4.

A rectangular wire frame 27 is provided, and is adapted to be positioned against the inner face of housing 17 with the top 28 thereof abutting shoulder 23, and the bottom 29 thereof resiliently retained in the transverse groove provided by lugs 25. As shown in Fig. 2, the top of the frame 27 is tapered, as at 29a, and provided with an inwardly extending corner 30, permitting the top portion of frame 27 to follow the contour of the inner surface of top portion 13.

The vertical sides 31 of frame 27 fixedly carry a plurality of vertically spaced, horizontal rectangular wires 32.

As shown in Fig. 3, the frame 27 is inserted into the rotisserie broiler combination 10 by first inserting the top 28 behind the shoulder 23, and then forcing the bottom 29 into the transverse groove provided by lugs 25, where the latter will be resiliently retained, as shown in dotted outline in the above figure. It will be noted that in the aforementioned position, the sides 31 of frame 27 are buttressed by contact with the inner face of housing 17, due to the vertical alignment of shoulder 23, the inner face of housing 17 and the transverse groove provided by lugs 25. To remove the frame 27 in a ready and easy manner it is only necessary to force the bottom 29 out of engagement with lugs 25, and rotate the frame outwardly, as shown in full lines in Fig. 3, grasping the frame by the rectangular wires 32.

A second rectangular wire frame 33 is provided, and is adapted to be positioned against the inner face of side shell 15 with the top 34 thereof received in transverse groove 24, and the bottom 35 thereof resiliently retained in the transverse groove provided by lugs 26. As shown in Fig. 1, the top of frame 33 is tapered, as at 36, and provided with an inwardly extending corner 37, permitting the top portion of frame 33 to follow the contour of the inner surface 22 of top portion 13.

The vertical side 38 remote from corner 37 is interrupted adjacent spit slot 19 to permit the insertion of spit 20 into the rotisserie without removing the frame 33, when desired. To compensate for this interruption, a diagonal brace 39 is provided, substantially as illustrated in Fig. 1.

The vertical sides 38 of frame 33 fixedly carry a plurality of vertically spaced, horizontal rectangular wires 40, each of which is aligned horizontally with a corresponding wire 32 of frame 27.

As shown in Fig. 4, the frame 33 is inserted into the rotisserie broiler combination 10 by first inserting the top 34 into the transverse groove 24, and then forcing the bottom 35 into the transverse groove provided by lugs 26, where the latter will be resiliently retained, as shown in full lines in the above figure. It will be noted that in the aforementioned position, the vertical sides 38 of frame 33 are buttressed by tensional contact with the inner face of side shell 15, as is the brace 39, due to the vertical alignment of groove 24, the inner face of side shell 15 and the transverse groove provided by lugs 26. To remove the frame 33 in a ready and easy manner it is only necessary to force the bottom 35 out of engagement with lugs 26, and then rotate the frame away from side shell 15, as shown in dotted lines in Fig. 4, grasping the frame by the rectangular wires 40.

When it is desired to use the unit 10 as a broiler, the frames 27 and 33 will be snapped into place in the manner described above with the wires 32 and 40 cooperating to support the ends of drip tray 41 at the level desired, as shown in Figs. 1 and 4. A wire grill, not shown, is then inserted in drip tray 41 and the meat to be broiled placed thereon in the usual manner, heat being provided by the heat element assembly in top portion 13 in a manner well known to those skilled in the art.

When it is desired to use the unit as a rotisserie, the frames 27 and 33 are snapped out of place and removed completely, prior to insertion of spit 20 and the meat in the usual manner, and the starting of the rotisserie motor. Thus the interior capacity of the rotisserie is increased by an amount equal to the volume normally occupied by the frames 27 and 33, and the tray-supporting wires 32 and 40, thereof. The drip tray 41 would then rest directly on base 11, below spit 20.

Due to the interruption of side 38 of frame 33 adjacent spit slot 19, the frames 27 and 33 may also be employed during operation of the unit as a rotisserie, if desired, as shown in Fig. 4, this being possible when it is not necessary to utilize the entire interior capacity of the unit.

While various changes may be made in the detailed construction, it shall be understood that such changes shall be within the spirit and scope of the invention as defined by the appended claim.

I claim:

In a rotisserie broiler combination having overhead heating elements, a rotisserie motor at one end and a spit slot at the other, a pair of wire frames adapted to be disposed on the interior of the rotisserie adjacent the inner surfaces of each end thereof, a plurality of vertically spaced wire shelves secured to the vertical sides of each of said frames at substantially right angles thereto, corresponding elements on each of said frames being aligned horizontally with each other, the frame adjacent the spit slot having an opening at its forward vertical side adapted to receive the rotisserie spit, a diagonal wire brace connecting opposite corners of said frame adjacent said spit slot, the inner surface of the top portion of the rotisserie at each end having a transverse groove adapted to receive the top of said frames, and resilient, transverse groove-forming means provided in the bottom of the rotisserie and aligned vertically at each end with said transverse grooves formed in the top portion of the rotisserie, said resilient means being adapted to resiliently retain the bottoms of said frames, said transverse grooves and resilient means being substantially aligned vertically with the inner surface of each end of the rotisserie whereby to tensionally buttress said frames intermediate the top and bottom portions thereof.

References Cited in the file of this patent

UNITED STATES PATENTS

| | | |
|---|---|---|
| 1,013,313 | Richardson | Jan. 2, 1912 |
| 1,172,179 | Bauer | Feb. 15, 1916 |
| 1,989,275 | Hatch | Jan. 29, 1935 |
| 2,170,409 | Hoffman | Aug. 22, 1939 |
| 2,558,294 | Finzie | June 26, 1951 |